(No Model.)
C. H. WICKERSHAM.
ELECTRIC HIGH AND LOW WATER DETECTOR FOR STEAM BOILERS.
No. 309,425. Patented Dec. 16, 1884.
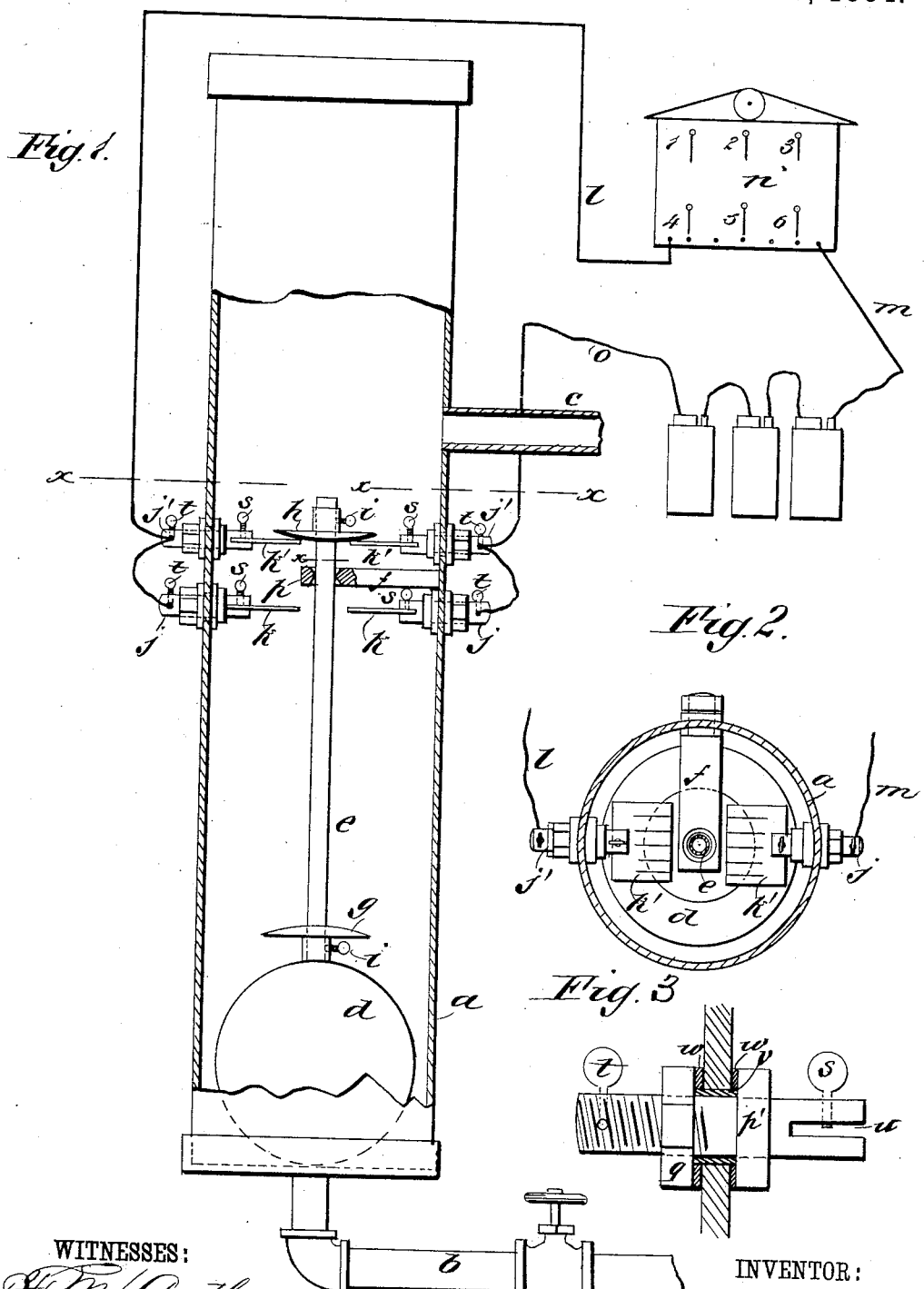

UNITED STATES PATENT OFFICE.

CHARLES HARVEY WICKERSHAM, OF POTTSTOWN, PENNSYLVANIA.

ELECTRIC HIGH AND LOW WATER DETECTOR FOR STEAM-BOILERS.

SPECIFICATION forming part of Letters Patent No. 309,425, dated December 16, 1884.

Application filed April 25, 1884. (No model.)

*To all whom it may concern:*

Be it known that I, CHARLES H. WICKERSHAM, of Pottstown, in the county of Montgomery and State of Pennsylvania, have invented a new and Improved Electric High and Low Water Detector for Steam-Boilers, of which the following is a full, clear, and exact description.

My invention consists of a galvanized iron stand-pipe, suitably connected with the boiler for circulation of water and steam, and containing a float having a vertical stem of a little greater length than the range between high and low water, and carrying electric conductors, which are brought into contact with conductors located inside of the tube at suitable points for completing the electric circuit, in which I include a multiplex annunciator, when several boilers are employed, by which all the boilers may be connected in one circuit.

The invention includes improvements in the construction of the conducting apparatus and the guide for the stem of the float, all as hereinafter fully described and specifically claimed.

Reference is to be had to the accompanying drawings, forming part of this specification, in which similar letters of reference indicate corresponding parts in all the figures.

Figure 1 is a partially-broken sectional elevation of the stand-pipe and the guide for the stem of the float, together with a side elevation of the battery and a front elevation of the annunciator. Fig. 2 is a cross-section of the stand-pipe on the broken line $x\,x\,x$, Fig. 1. Fig. 3 is a detail of the binding-posts for making the electrical connections through the stand-pipe as I propose to arrange them in practice.

I connect a galvanized-iron stand-pipe, $a$, of about five inches in diameter and suitable length with the boiler (not shown) by pipes $b$ and $c$, for the circulation of water and steam, and arrange a suitable float, $d$, in the tube, with a stem, $e$, a little longer than the range between high and low water, which extends upward through a guide, $f$, and has a copper disk, $g$, near the float, for making the connection to signal high water, and another disk, $h$, near the upper end, to make the connection for low water, said disks being adjustable along the stem with set-screws $i$, to set them according to the desired limits of the range of the water-level.

To make the connections for completing the electric circuit, I arrange the binding-posts $j$ for the wires $l\,o$ in opposite sides of the stand-pipe, and having copper plates $k$, attached inside of the tube for contact with the disk $g$, and suitably located for completing the circuit when the high level is reached, and I also arrange similar binding-posts, $j'$, and copper plates $k'$ higher up in the tube, for contact of the disk $h$, to complete the circuit for low water. The disks $g$ and $h$ are a little convex on the sides that make the connections with the copper plates $k\,k'$, and said plates are slitted into separate fingers in the bearing parts, so that said fingers will spring by the pressure of the water or weight of the float, and thus will make several points of contact to each plate to insure the proper electric contact, which might sometimes fail with only one or two points of contact in case any scale of non-conducting material should happen to get between the plates and disk, and the yielding of the fingers affords more certainty of connection with both plates in case the float should happen to incline a little more to one side than the other by the action of the water or imperfect balance, which would, in the case of non-yielding plates, prevent contact with one of them at least. As the float will be supported about half its height above the surface of the water, it will be seen that the connecting-plates are located a considerable distance above the water, where they will be much less liable to be fouled with deposits of the water or floating objects in it.

Any suitable form of alarm-signal may be connected with the wires $l\,m$ when only a single boiler is to be connected in the circuit; but for more than one I propose to employ a multiplex annunciator, $n$, such as is used in hotel-offices for connecting with the different rooms, so that each boiler of a series may be represented by a special signal device of the annunciator. I bevel the wall of the guide-hole through the guide-arm $f$ for the stem $e$ of the float to form a narrow edge, $p$, which will avoid the binding of the stem therein when the float shifts from side to side of the tube, and thus will allow the stem to rise and fall through the guide with less friction than otherwise. The galvanized stand-pipe will not rust, as an ordinary pipe will, and will not break, like a glass pipe.

For the binding-posts to make the electrical connections through the stand-pipe I propose in practice to employ copper bolts, having a collar, $p'$, outside and a check-nut, $q$, inside, with binding-screws $s$ and $t$, and holes or nicks $u$ for the wires, which I propose to insulate with a rubber tube, $v$, and rubber washer $w$, respectively, fitted through the holes of the stand-pipe and against the sides between the collar and nut, making a simple device for the purpose.

Having thus described my invention, I claim as new and desire to secure by Letters Patent—

1. The combination of the slitted conducting-plates $k$ $k'$ of the electric circuit, having elastic fingers, with the convex disks of the stem of the float, substantially as described.

2. The combination of a multiplex annunciator with an electric high and low water alarm-signal apparatus including two or more boilers in the circuit, having stand-pipe $a$, float $d$, copper disks $g$ $h$, and the conducting-plates $k$ $k'$, substantially as described.

3. In an electric high and low water detector, the combination, with the stand-pipe $a$, provided with conducting-plates connected with an alarm-float, $d$, and stem $e$, having connecting-plates, of the guide $f$, for the float-stem, having the bevel guide-edges $p$ in the hole for the stem, substantially as described.

CHARLES HARVEY WICKERSHAM.

Witnesses:
JOHN HARLEY,
J. E. WICKERSHAM.